Patented Jan. 5, 1954

2,665,245

UNITED STATES PATENT OFFICE 2,665,245

PHOTOCHEMICAL PRODUCTION OF 7-CHLOROCHOLESTERYL ESTER

Hermann Schaltegger, Flamatt, Switzerland, assignor to Dr. A. Wander A. G., Bern, Switzerland No Drawing. Application September 8, 1949, Serial No. 114,692

Claims priority, application Switzerland October 6, 1948

4 Claims. (Cl. 204—158)

The present invention refers to a process for the production of cholesteryl esters chlorinated in position 7, in which alkyl hypochlorides are treated with cholesteryl esters under the influence of ultraviolet light. It is an advantage to employ the stable tertiary butyl and tertiary amyl hypochlorites. In this manner it is possible to obtain the 7-chlorocholesteryl esters which have hitherto not been described.

*Example.*—7.5 gm. of cholesteryl benzoate are heated to boiling point in 50 cc. of carbon tetrachloride in an oxygen-free atmosphere. 5 gm. of tertiary butyl hypochlorite are then added, under simultaneous ultraviolet irradiation. The reaction is terminated within 3 to 4 minutes. Following evaporation of the solvent in a vacuum, a slightly yellowish resin remains, which yields crystallised 7-chlorocholesteryl benzoate upon treatment with 18 cc. of acetone. After recrystallisation it forms needles which melt at 168°.

What I claim is:
1. A photochemical process for the production of a 7-chlorocholesteryl ester, comprising the steps of dissolving cholesteryl ester in an inert solvent, reacting said ester with an alkyl hypochlorite selected from the group consisting of amyl hypochlorite and butyl hypochlorite under the influence of ultraviolet light, and isolating the 7-chlorocholesteryl ester produced.
2. A process according to claim 1 in which said hypochlorite is amyl hypochlorite.
3. A process according to claim 1 in which said hypochlorite is butyl hypochlorite.
4. A process according to claim 1 comprising the further step of isolating the 7-chlorocholesteryl ester by extraction with an inert solvent.

HERMANN SCHALTEGGER.

References Cited in the file of this patent

UNITED STATES PATENTS

| Number | Name | Date |
|---|---|---|
| 2,227,839 | Marker | Jan. 7, 1941 |
| 2,228,491 | Werder | Jan. 14, 1941 |
| 2,237,763 | Marker | Apr. 8, 1941 |
| 2,260,085 | Milas et al. | Oct. 21, 1941 |
| 2,439,203 | Ellingboe | Apr. 6, 1948 |
| 2,441,091 | Vliet et al. | May 4, 1948 |
| 2,443,494 | Cass | June 15, 1948 |
| 2,498,390 | Bernstein et al. | Feb. 21, 1950 |
| 2,531,688 | Jones et al. | Nov. 28, 1950 |

FOREIGN PATENTS

| Number | Country | Date |
|---|---|---|
| 574,432 | Great Britain | Jan. 4, 1946 |
| 608,482 | Great Britain | Sept. 15, 1948 |

OTHER REFERENCES

Groll et al.: Industrial and Engineering Chemistry, vol. 31 (1939), p. 1530.
Burgin et al.: Industrial and Engineering Chemistry, vol. 31 (1939), pp. 1413–1419.
Jones et al.: Nature, vol. 158 (1946), p. 69.
Ziegler et al.: Annalen, vol. 551 (1942), pp. 80–119.